United States Patent Office
3,449,342
Patented June 10, 1969

3,449,342
HALOGENATED ALLYLTHIO-s-TRIAZINES
Yoshiaki Sakurai and Teruo Ishizawa, Tokyo, Shuichi Ishida, Omiya, and Bunzo Sekine, Tokyo, Japan, assignors to Nippon Kayaku Kabushiki Kaisha, Tokyo, Japan, a corporation of Japan
No Drawing. Filed Aug. 14, 1967, Ser. No. 660,200
Int. Cl. C07d 55/20; A01n 9/22
U.S. Cl. 260—249.8                 10 Claims

ABSTRACT OF THE DISCLOSURE

Allylthio - bis - (alkylamino) - s - triazines which are substituted in the $\beta$ - position of the allyl group by a halogen, especially chlorine or bromine, and are of excellent antifungal activity while being well tolerated by cultivated plants; a method of controlling phytopathogenic fungi, especially on such cultivated plants as rice and the like with the aid of such triazines; and antifungal compositions containing such triazines as active ingredients.

DESCRIPTION OF THE INVENTION

This invention relates to novel allylthio - s - triazines, process for their production, control of phytopathogenic fungi therewith, and antifungal compositions containing the novel compounds as active ingredients.

Allylthio-s-triazines are known as herbicides of considerable phytotoxicity.

The present invention, however, provides novel allylthio-s-triazines of the formula

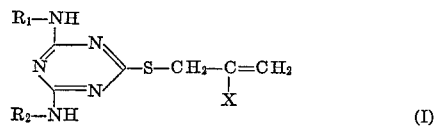

(I)

wherein each of $R_1$ and $R_2$ represents hydrogen or lower alkyl and X represents halogen, especially chlorine or bromine, which are unexpectedly of excellent antifungal activity while being at the same time, very well tolerated by cultivated plants.

The new compounds of Formula I as well as compositions containing them as active ingredients in combination with agriculturally acceptable carriers are thus useful for inhibiting the growth of various kinds of phytopathogenic pests that threaten cultivated plants, among them especially rice blast (*Piricularia oryzae*) which is known to infest rice plants.

When applied in amounts which effectively control rice blast, no noticeable damage to the rice plants could be observed. Preferred amounts range from 500 to 750 grams per hectare.

The novel compounds are readily prepared by reacting a sodium mercaptotriazine of the general formula

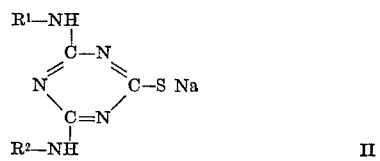

II in which $R^1$ and $R^2$ have the same meaning as in Formula I, with a dihalogeno-propene of the general formula

III in which X has the meaning as given above.

Details of how to make the compounds of Formula I will be seen from the following non-limitative examples. In these examples temperatures are given in degrees centigrade.

EXAMPLE 1

4 grams (g.) of pulverized sodium hydroxide are added to 200 ml. of dimethylformamide and 19.5 g. of 2-mercapto - 4,6 - bis - (ethylamino) - s - triazine are then added thereto at 20° with stirring. Stirring is continued for about 2 hours until a clear solution is obtained, the temperature of which has risen to about 35°. 11.2 g. of 2,3 - dichloropropene are then added dropwise to the solution with stirring, the latter being continued for a further two hours while maintaining the temperature of the mixture at about 40°.

After cooling, the reaction mixture is poured into 500 ml. of water, and the resulting mixture extracted with ethyl acetate. The extract is dried over sodium sulfate, the solvent evaporated and the residue recrystallized from iso-octane. 2 - (2' - chloro - allylthio) - 4,6 - bis - (ethylamino)-s-triazine thus obtained has a melting point of 42–45°.

Other compounds according to the invention which are prepared by repeating Example 1, but using in lieu of the s-triazine employed therein a correspondingly substituted amount of another triazine, and, where necessary, an equivalent amount of dibromopropene in lieu of dichloropropene, are the following:

Examples—

2 _____ 2 - (2' - chloro - allylthio) - 4 - isopropylamino - 6 - methylamino-s-triazine.
3 _____ 2 - (2' - chloro - allylthio) - 4 - isopropylamino - 6 - ethylamino-s-triazine.
4 _____ 2 - (2' - chloro - allylthio) - 4,6-bis-isopropylamino-s-triazine.
5 _____ 2 - (2' - chloro - allylthio) - 4,6-bis-amino-s-triazine.
6 _____ 2 - (2' - bromo - allylthio) - 4,6-bis-ethylamino-s-triazine.
7 _____ 2 - (2' - bromo - allylthio) - 4-ethylamino - 6 - isopropylamino - s-triazine.
8 _____ 2 - (2' - bromo - allylthio) - 4,6-bis-isopropylamino-s-triazine.
9 _____ 2 - (2' - bromo - allylthio) - 4,6-bis-amino-s-triazine.
10 _____ 2 - (2' - chloro - allylthio) - 4-ethylamino - 6 - sec - butylamino - s-triazine.
11 _____ 2 - (2' - bromo - allylthio) - 4,6-bis-sec - butylamino - s - triazine.

Fungus-growth inhibiting activities and control effects of compounds of this invention are shown by the following experiments which are to serve only as illustration.

Experiment 1

Minimum concentrations for inhibiting growth of rice blast were determined by the following method. Samples of 1 ml. of acetone, each containing known concentrations of a different compound of this invention and 19 ml. of potato-agar media were poured into a Petri dish of 9 cm. in diameter, mixed well, and solidified. Each of the agar plates thus prepared was inoculated with a loopful of colloidal suspension of sporn and hypha of *Piricularia oryzae*.

After incubating for 7 days at 28° C., minimum concentrations for inhibiting growth were determined. The results are shown in Table I:

| Compound of Example No.— | Minimum concentrations effectively inhibiting growth (mcg./ml.) |
|---|---|
| 1 | 12.5 |
| 2 | 12.5 |
| 3 | 6.25 |
| 4 | 25 |
| 5 | 6.25 |
| 6 | 3.125 |
| 7 | 3.125 |
| 8 | 3.125 |
| 9 | 6.25 |

The above results show that compounds according to this invention strongly inhibit the growth of blast (*Piricularia oryzae*).

Experiment 2

Young rice plants (variety: Saitama mochi No. 10) were grown in a vat of 5 cm. x 20 cm. surface to the stage of 3–4 leaves, whereupon they were treated with compounds of this invention.

In a series of samples, each of which consisted of a wettable powder containing 10% of the active compound listed in the first column of the following table, each sample was diluted with water to a content of 500 p.p.m. of active ingredient and admixed with a small quantity of distributing agent to afford a dispersible composition which was sprayed on a group of test plants. 24 hours after spraying, colloidal suspensions of conidium of blast incubated for 15 days in barley-rice straw media were sprayed on to the plants and also on to a lot of previously untreated control test plants. After inoculation, each plant was held in the incubator under the same conditions as in the preceding examples. Numbers of fungal spots were observed at 7 days after the inoculation. The results are shown in Table II below.

TABLE III

| Compound of Ex. No. | Concentration (p.p.m.) | Ratio of infected leaves | Number of fungal spots per leaf | Phytotoxicity |
|---|---|---|---|---|
| 1 | 500 | 16 | 0.26 | None. |
| 2 | 500 | 32 | 0.86 | Do. |
| 3 | 500 | 10 | 0.20 | Do. |
| 4 | 500 | 25 | 0.48 | Do. |
| 5 | 500 | 28 | 1.03 | Do. |
| 6 | 500 | 30 | 0.92 | Do. |
| 7 | 500 | 26 | 1.05 | Do. |
| 8 | 500 | 34 | 0.72 | Do. |
| 9 | 500 | 42 | 1.26 | Do. |
| Untreated lot | | 84 | 5.83 | |

Ratio of infected leaves $\times \frac{\text{number of infected leaves}}{\text{total number of leaves}} \times 100$ When the compounds according to the invention are formulated for use, suitable carriers or diluent for admixture therewith are for example the following: clay, kaolin, talcum powder, diatomaceous earth, silica, calcium carbonate, sawdust, etc. and/or water, benzene, alcohol, acetone, xylene, methylnaphthalene, cyclohexanone, dimethyl formamide, dimethyl sulfoxide, vegetable oils, animal oils, fatty acids, esters of fatty acids and various kinds of surfactants; adjuvants which are conventional in the preparation of agricultural chemicals, for example, stickers, emulsifying agents, wetting agents binding or adhesive agents may also be included for increasing the desired control effect. Moreover, the compounds according to the invention may be used, if desired, in admixture with compatible fungicides, insecticides, nematocides, herbicides and/or plant growth regulators, soil conditioners or fertilizers.

An amount of about 500 to 750 g. of active ingredient per hectare of planted area, especially of rice fields is recommended. When dressing rice seeds, the concentration of active ingredient in the dressing should preferably be in the range of about 100 to 150 p.p.m.

The following non-limitative examples illustrate the composition aspect of the invention further; parts are given therein by weight.

Example I

Mixing 3 parts of 2-(2′chloro-allylthio)-4,6-bis-ethyl-amino-s-triazine with 50 parts of talc and 47 parts of clay by weight, and crushing affords a dust composition suitable for application.

Example II 60 parts of 2(2′-chloro-allylthio)-4-isopropyl amino-6-methyl-amino-s-triazine were mixed with 17 parts of diatomaceous earth, one part of alkyl naphthalene sulfonate, and 2 parts of lignin sulfonate by weight to obtain a wettable powder which is readily dispersed and suspended in water for fungicidal use.

Example III 30 parts of 2-(2′-bromo-allylthio)-4-isopropyl-amino-6-ethylamino-s-triazine were solved in to 33 parts of methyl naphthalene, and admixed with 17 parts of polymer of alkylphenol ethyleneoxide to afford an emulsifiable solution which is readily dispersible in water, whereby aqueous spray compositions are obtained which are highly effective for the control blast.

Example IV 3 parts of 2-(2′-bromo-allylthio) - 4,6 - bis-isopropyl-amino-s-triazine were dissolved in 12 parts of xylene, and the solution was mixed with 60 parts of starch and 25 parts of polyvinyl pyrrolidone to formulate tablets.

The tables of this example can be dissolved in water to afford aqueous spray compositions which are used for the control of blast in the field, or aqueous solutions which are used as soaking agents for seeds, inhibiting the growth of blast.

We claim:

1. A compound of the formula

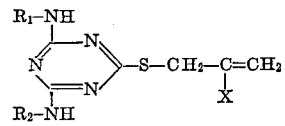

wherein each of $R_1$ and $R_2$ represents hydrogen or lower alkyl and X represents chlorine or bromine.

2. A compound as defined in claim 1, which is 2-(2′-chloro - allylthio) - 4 - isopropylamino - 6 - methylamino-s-triazine.

3. A compound as defined in claim 1, which is 2-(2′-chloro - allylthio) - 4 - isopropylamino - 6 - ethylamino-s-triazine.

4. A compound as defined in claim 1, which is 2-(2′-chloro-allylthio)-4,6-bis-isopropylamino-s-triazine.

5. A compound as defined in claim 1, which is 2-(2′-chloro-allylthio)-4,6-bis-amino-s-triazine.

6. A compound as defined in claim 1, which is 2-(2′-bromo-allylthio-4,6-bis-ethylamino-s-triazine.

7. A compound as defined in claim 1, which is 2-(2′-bromo-allylthio)-4,6-bis-isopropylamino-s-triazine.

8. A compound as defined in claim 1, which is 2-(2′-bromo-allylthio)-4,6-bis-sec-butylamino-s-triazine.

9. A compound as defined in claim 1, which is 2-(2′-bromo-allylthio)-4,6-bis-amino-s-triazine.

10. A compound as defined in claim 1, which is 2-(2′-chloro-allylthio)-4-ethylamino-6-sec-butylamino-s-triazine.

References Cited

UNITED STATES PATENTS 2,909,420 10/1959 Gysin et al. _____ 260—249.8 XR
3,326,912 6/1967 Yamamoto et al. ___ 260—249.8

HENRY R. JILES, *Primary Examiner.*
JOHN M. FORD, *Assistant Examiner.*

U.S. Cl. X.R.
424—249